US012322334B2

(12) United States Patent
Cho et al.

(10) Patent No.: US 12,322,334 B2
(45) Date of Patent: Jun. 3, 2025

(54) DISPLAY DEVICE

(71) Applicant: Samsung Display Co., LTD., Yongin-si (KR)

(72) Inventors: Eui-Myeong Cho, Yongin-si (KR); Yu-Chol Kim, Yongin-si (KR); Jihye Kim, Yongin-si (KR); Jin-Wook Yang, Yongin-si (KR); Seongoh Yeom, Yongin-si (KR); Jakyoung Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/235,998

(22) Filed: Aug. 21, 2023

(65) Prior Publication Data

US 2024/0161693 A1 May 16, 2024

(30) Foreign Application Priority Data

Nov. 10, 2022 (KR) ........................ 10-2022-0149114

(51) Int. Cl.
*G09G 3/3233* (2016.01)

(52) U.S. Cl.
CPC ... *G09G 3/3233* (2013.01); *G09G 2300/0426* (2013.01); *G09G 2300/0452* (2013.01); *G09G 2300/0819* (2013.01); *G09G 2300/0852* (2013.01); *G09G 2300/0861* (2013.01); *G09G 2310/0291* (2013.01); *G09G 2310/08* (2013.01); *G09G 2330/021* (2013.01)

(58) Field of Classification Search
CPC ......... G09G 3/3233; G09G 2300/0426; G09G 2300/0452; G09G 2300/0819; G09G 2300/0852; G09G 2300/0861; G09G 2310/0291; G09G 2310/08; G09G 2330/021
See application file for complete search history.

(56) References Cited

U.S. PATENT DOCUMENTS

| | | | | |
|---|---|---|---|---|
| 11,263,976 B2 | 3/2022 | Yang et al. | | |
| 2010/0123652 A1* | 5/2010 | Chen | G09G 3/3648 | 345/98 |
| 2011/0285950 A1* | 11/2011 | Su | G09G 3/3648 | 349/139 |

(Continued)

FOREIGN PATENT DOCUMENTS

| | | | |
|---|---|---|---|
| CN | 104991389 | A | 10/2015 |
| CN | 110187576 | A | 8/2019 |
| KR | 20220032359 | A | 3/2022 |

*Primary Examiner* — Md Saiful A Siddiqui
(74) *Attorney, Agent, or Firm* — CANTOR COLBURN LLP

(57) ABSTRACT

A display device includes a display panel which includes first and second pixels disposed in one pixel row, a first gate line connected to the first pixel, a second gate line connected to the second pixel, a first data line connected to the first pixel, and a second data line connected to the second pixel, a gate driver which provides a first gate signal and a second gate signal to the first gate line and the second gate line, respectively, and a data driver disposed adjacent to a first side of the display panel, where the data driver provides a data signal to the first data line. The first data line and the second data line are connected to each other at a second side of the display panel opposite to the first side of the display panel.

15 Claims, 13 Drawing Sheets

(56) References Cited

U.S. PATENT DOCUMENTS

| | | | | |
|---|---|---|---|---|
| 2013/0293821 | A1* | 11/2013 | Su | G09G 3/3648 349/143 |
| 2014/0267473 | A1* | 9/2014 | Washio | G09G 3/3607 345/694 |
| 2016/0078826 | A1* | 3/2016 | Yoo | G09G 3/3648 345/88 |
| 2016/0093260 | A1* | 3/2016 | Watsuda | G09G 3/3611 345/87 |
| 2017/0061928 | A1* | 3/2017 | Kim | G09G 3/3685 |
| 2018/0240423 | A1* | 8/2018 | Park | G09G 3/3685 |
| 2019/0080651 | A1* | 3/2019 | Kim | G09G 3/3225 |
| 2020/0160768 | A1* | 5/2020 | Wang | G09G 3/20 |
| 2021/0174721 | A1* | 6/2021 | Hsu | G09G 3/20 |
| 2021/0201770 | A1* | 7/2021 | Park | G11C 19/28 |
| 2021/0248961 | A1* | 8/2021 | Yang | G09G 3/3233 |
| 2022/0198985 | A1* | 6/2022 | Kim | G09G 3/3291 |

* cited by examiner

DISPLAY DEVICE

This application claims priority to Korean Patent Application No. 10-2022-0149114, filed on Nov. 10, 2022, and all the benefits accruing therefrom under 35 U.S.C. § 119, the content of which in its entirety is herein incorporated by reference.

BACKGROUND

1. Field

Embodiments relate to a display device that displays an image.

2. Description of the Related Art

A display device may include pixels connected to gate lines and data lines, a gate driver for providing gate signals to the gate lines, and a data driver for providing data signals to the data lines. The pixels may emit light for displaying an image based on the gate signals and the data signals.

In order to reduce the number of channels (or amplifiers) of the data driver, the display device may further include a demultiplexer including a switch for selectively connecting the channels of the data driver and the data lines.

SUMMARY

In a display device where a demultiplexer is included, power consumption and a dead space of the display device may be increased due to the demultiplexer.

Embodiments provide a display device in which power consumption is reduced and a dead space decreases.

A display device according to embodiments includes a display panel which includes a first pixel and a second pixel disposed in one pixel row, a first gate line connected to the first pixel, a second gate line connected to the second pixel and parallel to the first gate line, a first data line connected to the first pixel and crossing the first gate line, and a second data line connected to the second pixel and parallel to the second data line, a gate driver which provides a first gate signal and a second gate signal to the first gate line and the second gate line, respectively, and a data driver disposed adjacent to a first side of the display panel, where the data driver provides a data signal to the first data line. In such an embodiment, the first data line and the second data line are connected to each other at a second side of the display panel opposite to the first side of the display panel.

In an embodiment, the first data line and the second data line may be adjacent to each other.

In an embodiment, the first pixel and the second pixel may emit light of different colors from each other.

In an embodiment, the first pixel and the second pixel may emit light of a same color as each other.

In an embodiment, the second gate signal may be a signal obtained by shifting the first gate signal by one horizontal time.

In an embodiment, the display panel may further include a third pixel disposed in the one pixel row, a third gate line connected to the third pixel and parallel to the first gate line, and a third data line connected to the third pixel and parallel to the first data line. In such an embodiment, the second data line and the third data line may be connected to each other at the first side of the display panel.

In an embodiment, the first data line, the second data line, and the third data line may be adjacent to each other.

In an embodiment, the first pixel, the second pixel, and the third pixel may emit light of different colors from each other.

In an embodiment, the gate driver may provide a third gate signal to the third gate line. The second gate signal may be a signal obtained by shifting the first gate signal by one horizontal time, and the third gate signal may be a signal obtained by shifting the second gate signal by one horizontal time.

In an embodiment, the display panel may further include a fourth pixel disposed in the one pixel row, a fourth gate line connected to the fourth pixel and parallel to the first gate line, and a fourth data line connected to the fourth pixel and parallel to the first data line. In such an embodiment, the third data line and the fourth data line may be connected to each other at the second side of the display panel.

In an embodiment, the first data line, the second data line, the third data line, and the fourth data line may be adjacent to each other.

In an embodiment, each of the first gate signal and the second gate signal may include a write gate signal, a compensation gate signal, an initialization gate signal, and a bypass gate signal. In such an embodiment, each of the first pixel and the second pixel may include a first transistor including a gate electrode connected to a first node, a first electrode connected to a first power line, and a second electrode connected to a second node, a second transistor including a gate electrode which receives the write gate signal, a first electrode which receives the data signal, and a second electrode connected to a third node, a third transistor including a gate electrode which receives the compensation gate signal, a first electrode connected to the second node, and a second electrode connected to the first node, a fourth transistor including a gate electrode which receives the initialization gate signal, a first electrode connected to an initialization voltage line, and a second electrode connected to the first node, a fifth transistor including a gate electrode which receives the compensation gate signal, a first electrode connected to a reference voltage line, and a second electrode connected to the third node, a sixth transistor including a gate electrode which receives an emission control signal, a first electrode connected to the second node, and a second electrode connected to a fourth node, a seventh transistor including a gate electrode which receives the bypass gate signal, a first electrode connected to the initialization voltage line, and a second electrode connected to the fourth node, a first capacitor connected between the first power line and the third node, a second capacitor connected between the first node and the third node, and a light emitting diode connected between the fourth node and a second power line.

A display device according to embodiments includes a display panel which includes a plurality of gate lines, a plurality of data lines crossing the plurality of gate lines, and a plurality of pixels connected to the plurality of gate lines and the plurality of data lines, a gate driver which provides a plurality of gate signals to the plurality of gate lines, and a data driver disposed adjacent to a first side of the display panel, where the data driver provides a plurality of data signals to the plurality of data lines. In such an embodiment, at least two data lines among the plurality of data lines are connected to each other at a second side of the display panel opposite to the first side of the display panel.

In an embodiment, the least two data lines may be respectively connected to pixels which emit light of a same color as each other among the plurality of pixels.

In an embodiment, the data driver may include a plurality of amplifiers which outputs the plurality of data signals, respectively. In such an embodiment, the at least two data lines may be electrically connected to only one amplifier among the plurality of amplifiers.

In an embodiment, the number of the plurality of amplifiers may be less than or equal to a half of the number of the plurality of data lines.

A display device according to embodiments includes a display panel which includes a plurality of gate lines, a plurality of data lines crossing the plurality of gate lines, and a plurality of pixels connected to the plurality of gate lines and the plurality of data lines, a gate driver which provides a plurality of gate signals to the plurality of gate lines, and a data driver which provides a plurality of data signals to the plurality of data lines and includes a plurality of terminals connected to the plurality of data lines, respectively. In such an embodiment, at least two terminals among the plurality of terminals may be connected to each other inside the data driver.

In an embodiment, the at least two terminals may be respectively connected to pixels which emit light of a same color as each other among the plurality of pixels.

In an embodiment, the data driver may include a plurality of amplifiers which outputs the plurality of data signals, respectively. In such an embodiment, the at least two terminals may be connected to only one amplifier among the plurality of amplifiers.

In an embodiment, the number of the plurality of amplifiers may be less than or equal to a half of the number of the plurality of data lines.

In the display device according to embodiments, at least two data lines may be connected to each other at a side opposite to a side adjacent to a data driver, or may be connected to each other inside the data driver, so that the number of channels of the data driver may decrease without using a demultiplexer. Accordingly, power consumption of the display device may be reduced, and a dead space of the display device may decrease.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
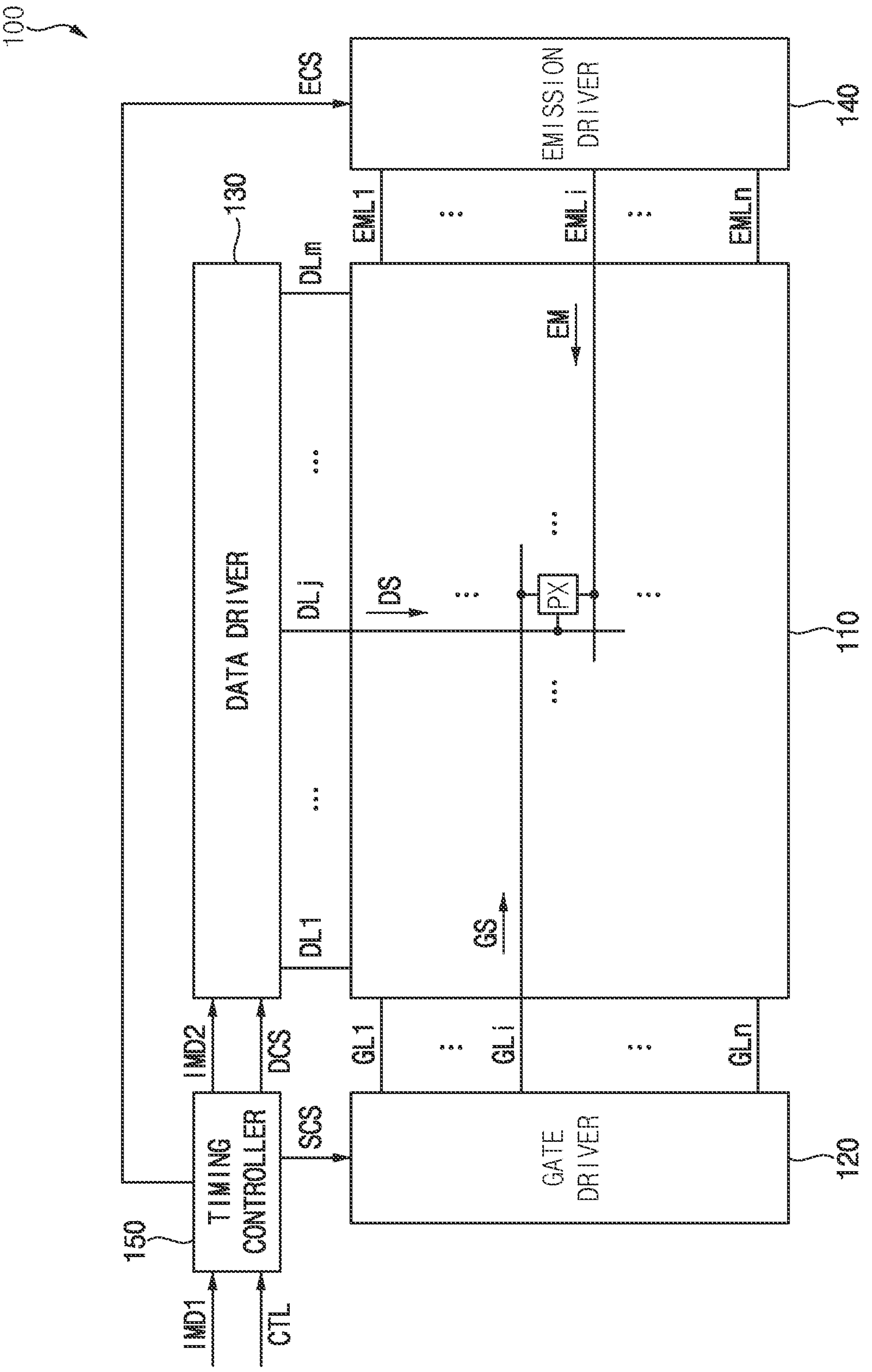
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the disclosure will be described in detail with reference to the accompanying drawings.

FIG. 1 is a block diagram illustrating a display device 100 according to an embodiment.

Referring to FIG. 1, an embodiment of the display device 100 may include a display panel 110, a gate driver 120, a data driver 130, an emission driver 140, and a timing controller 150.

The display panel 110 may include gate lines GL1, . . . , GLn (n is a natural number greater than 1), data lines DL1, . . . , DLm (m is a natural number greater than 1), emission control lines EML1, . . . , EMLn, and pixels PX. The data lines DL1, . . . , DLm may cross the gate lines GL1, . . . , GLn, and the emission control lines EML1, . . . , EMLn may be parallel to the gate lines GL1, . . . , GLn.

The pixels PX may be connected to the gate lines GL1, . . . , GLn, the data lines DL1, . . . , DLm, and the emission control lines EML1, . . . , EMLn. In an embodiment, the pixels PX may include red pixels that emit red light, green pixels that emit green light, and blue pixels that emit blue light. The pixels PX may define pixel rows and pixel columns, that is, the pixels PX may be arranged in a matrix form.

The gate driver 120 may provide gate signals GS to the gate lines GL1, . . . , GLn. The gate driver 120 may generate the gate signals GS based on a first control signal SCS. The first control signal SCS may include a gate start signal, a gate clock signal, or the like. In an embodiment, the gate driver 120 may be implemented with transistors and capacitors disposed in a non-display area of the display panel 110.

Figure 2:
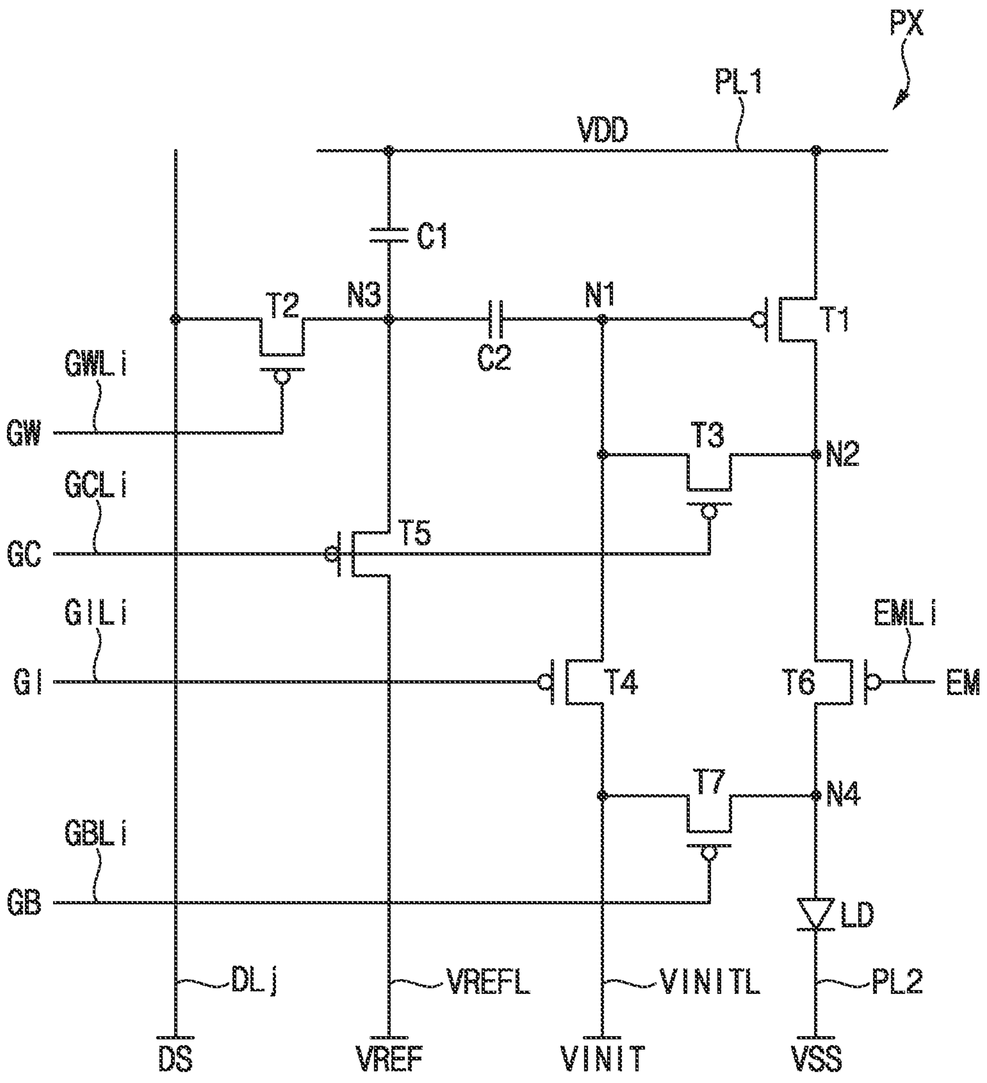
FIG. 2 is a circuit diagram illustrating a pixel according to an embodiment.

In an embodiment, each of the gate signals GS may include a write gate signal GW (shown in FIG. 2), a compensation gate signal GC (shown in FIG. 2), an initialization gate signal GI (shown in FIG. 2), and a bypass gate signal GB (shown in FIG. 2). In such an embodiment, each of the gate lines GL1, . . . , GLn may include a write gate line that transmits the write gate signal GW, a compensation gate line that transmits the compensation gate signal GC, an initialization gate line that transmits the initialization gate signal GI, and a bypass gate line that transmits the bypass gate signal GB.

The data driver 130 may provide data signals DS to the data lines DL1, . . . , DLm. The data driver 130 may generate the data signals DS based on second image data IMD2 and a second control signal DCS. The second image data IMD2 may include grayscale values respectively corresponding to the pixels PX. The second control signal DCS may include a data start signal, a data clock signal, a load signal, or the like. The data signals DS may correspond to the grayscale values of the second image data IMD2. In an embodiment, the data driver 130 may be implemented with a plurality of integrated circuits.

The emission driver 140 may provide emission control signals EM to the emission control lines EML1, . . . , EMLn. The emission driver 140 may generate the emission control signals EM based on a third control signal ECS. The third control signal ECS may include an emission control start signal, an emission control clock signal, or the like. In an embodiment, the emission driver 140 may be implemented with transistors and capacitors disposed in the non-display area of the display panel 110.

The timing controller 150 may control an operation of the gate driver 120, an operation of the data driver 130, and an operation of the emission driver 140. The timing controller 150 may generate the second image data IMD2, the first control signal GCS, the second control signal DCS, and the third control signal ECS based on first image data IMID and a control signal CTL provided from an outside of the display device 100 (e.g., an external processor). The first image data IMD1 may include grayscale values respectively corresponding to the pixels PX. The control signal CTL may include a clock signal, a vertical synchronization signal, a horizontal synchronization signal, or the like. In an embodiment, the timing controller 150 may be implemented as at least one integrated circuit disposed in the non-display area of the display panel 110 or disposed on a printed circuit board connected to the non-display area of the display panel 110.

FIG. 2 is a circuit diagram illustrating a pixel PX according to an embodiment. FIG. 2 may illustrate a pixel PX disposed in an $i^{th}$ pixel row (i is a natural number greater than or equal to 1 and less than or equal to n) and a $j^{th}$ pixel column (j is a natural number greater than or equal to 1 and less than or equal to m) and included in the display device 100 in FIG. 1.

Referring to FIG. 2, an embodiment of the pixel PX may include a light emitting diode LD and a pixel circuit.

The light emitting diode LD may be connected between a first power line PL1 and a second power line PL2. The first power line PL1 may transmit a first power voltage VDD, and the second power line PL2 may transmit a second power voltage VSS. A first electrode (e.g., an anode electrode) of the light emitting diode LD may be connected to the first power line PL1 via the pixel circuit, and a second electrode (e.g., a cathode) of the light emitting diode LD may be connected to the second power line PL2. The light emitting diode LD may emit light with luminance corresponding to a driving current provided from the pixel circuit.

The first power voltage VDD and the second power voltage VSS may have a potential difference allowing the light emitting diode LD to emit light. In an embodiment, for example, the first power voltage VDD may be a high-potential pixel voltage, and the second power voltage VSS may have a low-potential pixel voltage having a potential less than the first power voltage VDD by a threshold voltage of the light emitting diode LD or more.

The light emitting diode LD may be an organic light emitting diode ("OLED") including an organic light emitting layer, but the disclosure is not limited thereto. In an embodiment, for example, the light emitting diode LD may be an inorganic light emitting diode.

The pixel circuit may include at least one transistor and at least one capacitor. In an embodiment, the pixel circuit may include a first transistor T1 (e.g., a driving transistor), a second transistor T2 (e.g., a write transistor), a third transistor T3 (e.g., a compensation transistor), a fourth transistor T4 (e.g., an initialization transistor), a fifth transistor T5 (e.g., a reference transistor), a sixth transistor T6 (e.g., an emission transistor), a seventh transistor T7 (e.g., a bypass transistor), a first capacitor C1 (e.g., a hold capacitor), and a second capacitor C2 (e.g., a storage capacitor). Each of the first transistor T1, the second transistor T2, the third transistor T3, the fourth transistor T4, the fifth transistor T5, the sixth transistor T6, and the seventh transistor T7 may be a P-type transistor (e.g., a P-type metal-oxide-semiconductor ("PMOS") transistor). However, the disclosure is not limited thereto, and at least one of the first transistor T1, the second transistor T2, the third transistor T3, the fourth transistor T4, the fifth transistor T5, the sixth transistor T6, and the seventh transistor T7 may be an N-type transistor (e.g., an N-type metal-oxide-semiconductor ("NMOS") transistor).

The first transistor T1 may include a first electrode connected to the first power line PL1, a second electrode connected to a second node N2, and a gate electrode connected to a first node N1. The first transistor T1 may control the driving current flowing through the light emitting diode LD in response to a source-gate voltage (i.e., a voltage between the first electrode and the gate electrode of the first transistor T1).

The first capacitor C1 may be connected between the first power line PL1 and the third node N3. The first capacitor C1 may store a potential difference between a voltage of the third node N3 and the first power voltage VDD, and may stabilize the voltage of the third node N3.

The second capacitor C2 may be connected between the first node N1 and the third node N3. The second capacitor C2 may store a potential difference between a voltage of the first node N1 and the voltage of the third node N3.

The second transistor T2 may include a first electrode connected to the data line DLj, a second electrode connected to the third node N3, and a gate electrode connected to the write gate line GWLi. The data line DLj may transmit the data signal DS, and the write gate line GWLi may transmit the write gate signal GW. The second transistor T2 may be turned on in response to the write gate signal GW having a gate-on voltage level (or a turn-on voltage level or a logic low level), and may provide the data signal DS to the third node N3.

The third transistor T3 may include a first electrode connected to the second node N2, a second electrode connected to the first node N1, and a gate electrode connected to the compensation gate line GCLi. The compensation gate line GCLi may transmit the compensation gate signal GC. The third transistor T3 may be turned on in response to the compensation gate signal GC having the gate-on voltage level, and may connect the first node N1 and the second node N2. In other words, the first transistor T1 may be turned on in a diode-connected form by the third transistor T3. In this case, a voltage corresponding to a difference between the first power voltage VDD and a threshold voltage of the first transistor T1 may be sampled in the first node N1.

The fourth transistor T4 may include a first electrode connected to an initialization voltage line VINITL, a second electrode connected to the first node N1, and a gate electrode connected to the initialization gate line GILi. The initialization voltage line VINITL may transmit the initialization voltage VINIT, and the initialization gate line GILi may transmit the initialization gate signal GI. The fourth transistor T4 may be turned on in response to the initialization gate signal GI having the gate-on voltage level, and may provide the initialization voltage VINIT to the first node N1. The fourth transistor T4 may initialize the first node N1 with the initialization voltage VINIT.

The fifth transistor T5 may include a first electrode connected to a reference voltage line VREFL, a second electrode connected to the third node N3, and a gate electrode connected to the compensation gate line GCLi. The reference voltage line VREFL may transmit the reference voltage VREF. The fifth transistor T5 may be turned on in response to the compensation gate signal GC having the gate-on voltage level, and may provide the reference voltage VREF to the third node N3. The fifth transistor T5 may initialize the third node N3 with the reference voltage VREF.

The sixth transistor T6 may include a first electrode connected to the second node N2, a second electrode connected to a fourth node N4, and a gate electrode connected to the emission control line EMLi. The emission control line EMLi may transmit the emission control signal EM. The sixth transistor T6 may be turned on in response to the emission control signal EM having the gate-on voltage level, and may form a current path between the second node N2 and the light emitting diode LD. In other words, when the sixth transistor T6 is turned on, the driving current may be provided to the light emitting diode LD, and the light emitting diode LD may emit light with luminance corresponding to the driving current.

The seventh transistor T7 may include a first electrode connected to the initialization voltage line VINITL, a second electrode connected to the fourth node N4, and a gate electrode connected to the bypass gate line GBLi. The bypass gate line GBLi may transmit the bypass gate signal GB. The seventh transistor T7 may be turned on in response to the bypass gate signal GB having the gate-on voltage level, and may provide the initialization voltage VINIT to the fourth node N4. The seventh transistor T7 may initialize the fourth node N4 with the initialization voltage VINIT. In this case, charges stored in a parasitic capacitor formed in the light emitting diode LD (i.e., a parasitic capacitor generated due to a structure of the light emitting diode LD) may be initialized by the initialization voltage VINIT.

Figure 3:
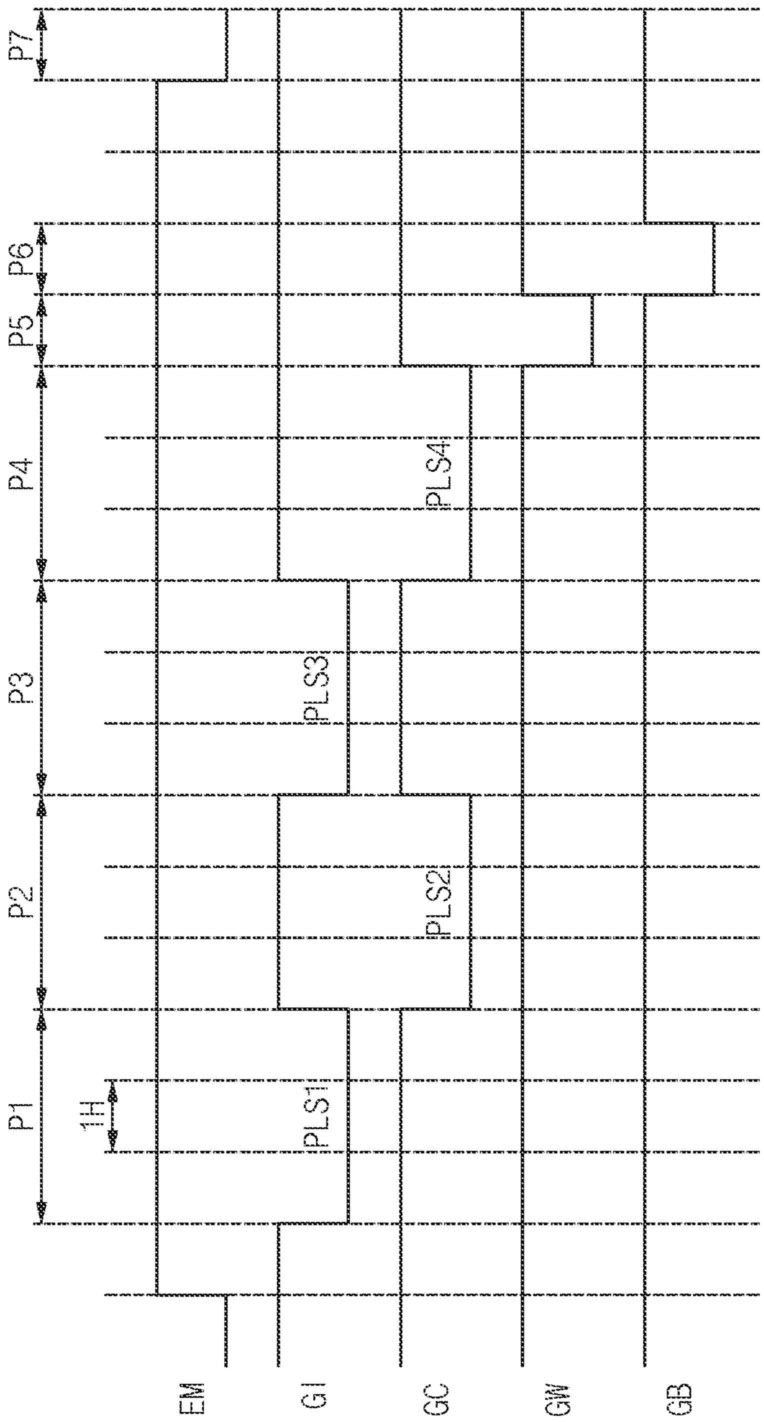
FIG. 3 is a signal timing diagram for describing an operation of the pixel in FIG. 2.

FIG. 3 is a signal timing diagram illustrating an operation of the pixel PX in FIG. 2.

Referring to FIGS. 2 and 3, a period in which the emission control signal EM has a gate-off voltage level (or a turn-off voltage level or a logic high level) (i.e., a non-emission period of the pixel PX) may include a first period P1, a second period P2, a third period P3, a fourth period P4, a fifth period P5, and a sixth period P6. A period in which the emission control signal EM has a gate-on voltage level (or a turn-on voltage level or a logic low level) (i.e., an emission period of the pixel PX) may include a seventh period P7. The first period P1, the second period P2, the third period P3, the fourth period P4, the fifth period P5, the sixth period P6, and the seventh period P7 may be included in one frame period.

During the first period P1, the initialization gate signal GI may have the gate-on voltage level. In other words, the initialization gate signal GI may have a first pulse PLS1 having the gate-on voltage level in the first period P1. A pulse width of the first pulse PLS1 may be greater than or equal to three horizontal times or periods (3H). One horizontal time (1H) may be a time allotted for writing the data signal DS into the pixel PX. During the first period P1, each of the compensation gate signal GC, the write gate signal GW, and the bypass gate signal GB may have the gate-off voltage level.

In the first period P1, the fourth transistor T4 may be turned on in response to the initialization gate signal GI having the gate-on voltage level (or the first pulse PLS1), and the initialization voltage VINIT may be primarily provided to the first node N1. In other words, the first node N1 may be initialized with the initialization voltage VINIT, and the voltage of the first node N1 (or a voltage of the gate electrode of the first transistor T1) may become equal to the initialization voltage VINIT.

Since the first electrode of the first transistor T1 is connected to the first power line PL1, a voltage of the first electrode of the first transistor T1 may be equal to the first power voltage VDD. A voltage of the third node N3 may be a voltage of a previous data signal (i.e., a voltage of a data signal of a previous frame period) by the first capacitor C1.

In the first period P1, the first node N1 (or the gate electrode of the first transistor T1) may be initialized by the initialization voltage VINIT.

During the second period P2, the compensation gate signal GC may have the gate-on voltage level. In other words, the compensation gate signal GC may have a second pulse PLS2 having the gate-on voltage level in the second period P2. The compensation gate signal GC may have a waveform obtained by shifting the initialization gate signal GI by the first period P1 (e.g., three horizontal times). Accordingly, a pulse width of the second pulse PLS2 may be equal to or greater than three horizontal times, equal to the pulse width of the first pulse PLS1. During the second period P2, each of the initialization gate signal GI, the write gate signal GW, and the bypass gate signal GB may have the gate-off voltage level.

In the second period P2, the fifth transistor T5 may be turned on in response to the compensation gate signal GC having the gate-on voltage level (or the second pulse PLS2), and the reference voltage VREF may be primarily provided to the third node N3. In other words, the third node N3 may be initialized with the reference voltage VREF, and the voltage of the third node N3 may be changed to be equal to the reference voltage VREF.

In the second period P2, the third transistor T3 may be turned on in response to the compensation gate signal GC having the gate-on voltage level (or the second pulse PLS2), and the gate electrode and the second electrode of the first transistor T1 may be connected. In other words, the first transistor T1 may be diode-connected. When the first transistor T1 may be diode-connected, a voltage corresponding to a difference between the first power voltage VDD and the threshold voltage of the first transistor T1 may be sampled in the first node N1. The voltage of the first node N1 may be similar to the voltage corresponding to the difference between the first power voltage VDD and the threshold voltage of the first transistor T1, but may be different from the difference between the first power voltage VDD and the threshold voltage of the first transistor T1. In an embodiment, for example, the voltage of the first node N1 may include a voltage component of the previous data signal due to capacitor coupling of the second capacitor C2.

As the voltage of the third node N3 changes from the voltage of the previous data signal to the reference voltage VREF, the amount of change in the voltage of the third node N3 may be transferred to the first node N1 through the capacitor coupling of the second capacitor C2. Accordingly, the voltage of the first node N1 may further include the voltage component of the previous data signal (i.e., the amount of change in the voltage of the third node N3), different from the ideal sampling voltage (e.g., the voltage corresponding to the difference between the first power voltage VDD and the threshold voltage of the first transistor T1).

When the compensation gate signal GC having the gate-on voltage level is greater than or equal to three horizontal times, the threshold voltage of the first transistor T1 may be more accurately sampled, and the threshold voltage of the first transistor T1 may be accurately reflected in the data signal DS.

During the third period P3, the initialization gate signal GI may have the gate-on voltage level. In other words, the initialization gate signal GI may have a third pulse PLS3 having the gate-on voltage level in the third period P3. A pulse width of the third pulse PLS3 may be equal to the pulse width of the first pulse PLS1. During the third period P3, each of the compensation gate signal GC, the write gate signal GW, and the bypass gate signal GB may have the gate-off voltage level.

In the third period P3, the fourth transistor T4 may be turned on in response to the initialization gate signal GI having the gate-on voltage level (or the third pulse PLS3), and the initialization voltage VINIT may be secondarily provided to the first node N1. In other words, the first node N1 (or the gate electrode of the first transistor T1) may be initialized with the initialization voltage VINIT in the third period P3. The voltage of the third node N3 may be maintained equal to the reference voltage VREF by the reference voltage VREF applied in the second period P2.

During the fourth period P4, the compensation gate signal GC may have the gate-on voltage level. In other words, the compensation gate signal GC may have a fourth pulse PLS4 having the gate-on voltage level in the fourth period P4. A pulse width of the fourth pulse PLS4 may be equal to the pulse width of the second pulse PLS2. During the fourth period P4, each of the initialization gate signal GI, the write gate signal GW, and the bypass gate signal GB may have the gate-off voltage level.

In the fourth period P4, the fifth transistor T5 may be turned on in response to the compensation gate signal GC having the gate-on voltage (or the fourth pulse PLS4), and the reference voltage VREF may be secondarily provided to the third node N3. In the fourth period P4, the third transistor T3 may be turned on in response to the compensation control signal GC having the gate-on voltage level (or the fourth pulse PLS4), and the gate electrode and the second electrode of the first transistor T1 may be connected to each other.

A voltage corresponding to a difference between the first power voltage VDD and the threshold voltage of the first transistor T1 may be sampled in the first node N1. A voltage of the first node N1 may be equal to the difference between the first power voltage VDD and the threshold voltage of the first transistor T1.

Since the voltage of the third node N3 is maintained as the reference voltage VREF, the voltage component of the previous data signal may be removed from the voltage of the first node N1. Accordingly, the voltage of the first node N1 may be normally compensated.

During the fifth period P5, the write gate signal GW may have the gate-on voltage level. In other words, the write gate signal GW may have a pulse having the gate-on voltage level in the fifth period P5. A pulse width of the write gate signal GW may be one horizontal time (1H). During the fifth period P5, each of the initialization gate signal GI, compensation gate signal GC, and bypass gate signal GB may have the gate-off voltage level.

In the fifth period P5, the second transistor T2 may be turned on in response to the write gate signal GW having the gate-on voltage level, and the data signal DS may be provided to the third node N3, such that the voltage of the third node N3 may change to a voltage of the data signal DS. As the first node N1 is connected to the third node N3 by the second capacitor C2, the amount of change in the voltage of the third node N3 may be reflected in the first node N1.

During the sixth period P6, the bypass gate signal GB may have the gate-on voltage level. In other words, the bypass gate signal GB may have a pulse having the gate-on voltage level in the sixth period P6. The bypass gate signal GB may have a waveform obtained by shifting the write gate signal GW by the fifth period P5 (e.g., one horizontal time). Accordingly, a pulse width of the bypass gate signal GB may be equal to the pulse width of the write gate signal GW. During the sixth period P6, each of the initialization gate signal GI, compensation gate signal GC, and write gate signal GW may have the gate-off voltage level.

In the sixth period P6, the seventh transistor T7 may be turned on in response to the bypass gate signal GB having the gate-on voltage level, and the initialization voltage VINIT may be provided to the fourth node N4, such that the charge stored in the parasitic capacitor formed in the light emitting diode LD (i.e., the parasitic capacitor generated due to the structure of the light emitting diode LD) may be initialized by the initialization voltage VINIT, and the pixel PX may have more uniform luminance characteristics.

During the seventh period P7, the emission control signal EM may have the gate-on voltage level, and each of the initialization gate signal GI, the compensation gate signal GC, the write gate signal GW, and the bypass gate signal GB may have the gate-off voltage level.

In the seventh period P7, the sixth transistor T6 may be turned on in response to the emission control signal EM, and a current path may be formed between the second node N2 and the light emitting diode LD, such that the driving current may be provided to the light emitting diode LD, and the light emitting diode LD may emit light with luminance corresponding to the driving current.

In an embodiment, as described with reference to FIGS. 2 and 3, in one frame period, each of the initialization gate signal GI and the compensation gate signal GC may include two pulses having the gate-on voltage level, and each of pulse widths of the two pulses may be three horizontal times or more. Accordingly, the threshold voltage of the first transistor T1 may be accurately sampled.

In such an embodiment, the first node N1 (or the gate electrode of the first transistor T1) and the third node N3 may be sequentially initialized twice by two pulses of each of the initialization gate signal GI and the compensation gate signal GC. Accordingly, the voltage component (or influence) of the previous data signal may be removed from the voltage of the first node N1, and the threshold voltage of the first transistor T1 may be more accurately compensated for the voltage of the first node N1.

Figure 4:
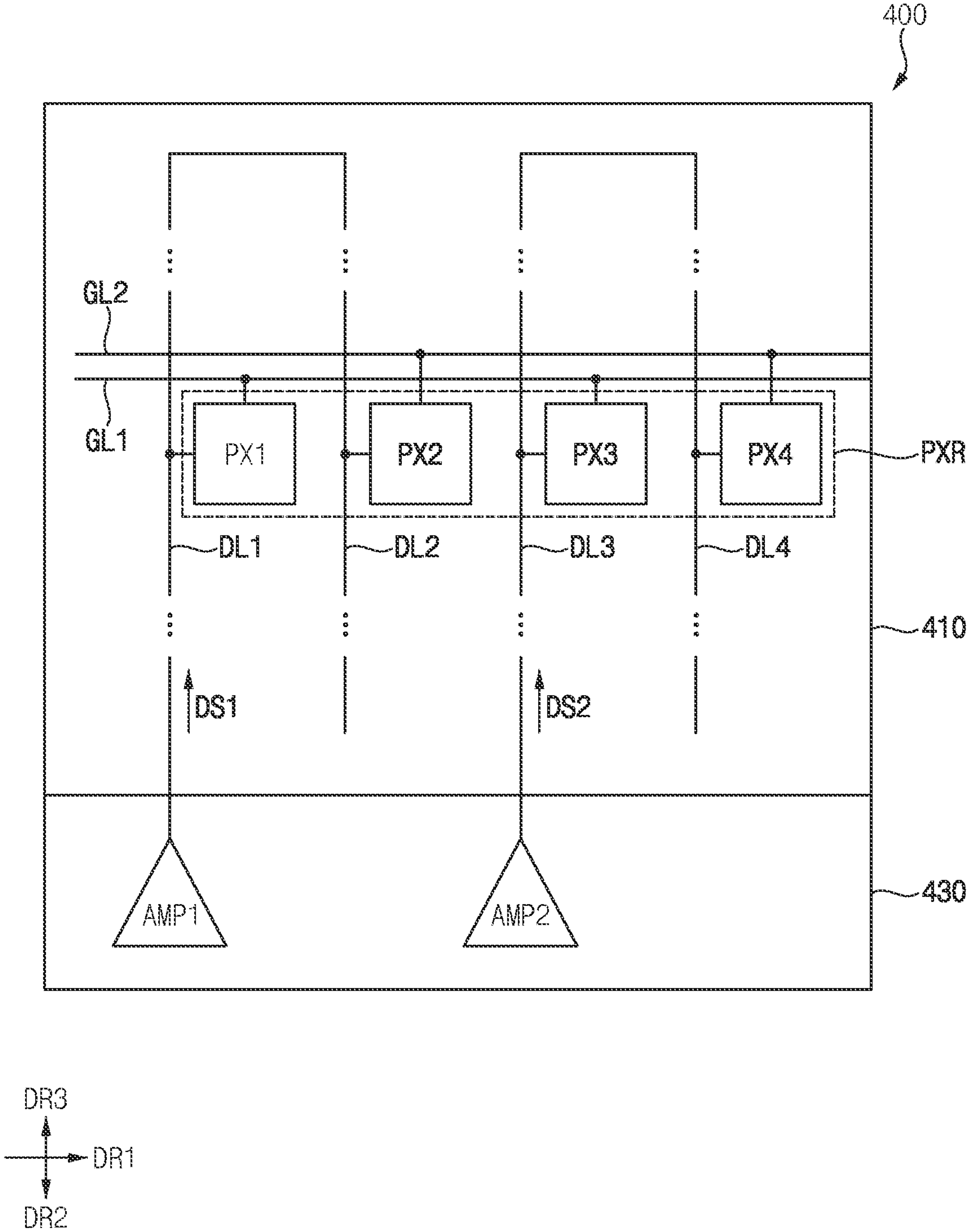
FIG. 4 is a plan view illustrating a portion of a display device according to an embodiment.

FIG. 4 is a plan view illustrating a portion of a display device 400 according to an embodiment.

Referring to FIG. 4, an embodiment of the display device 400 may include a display panel 410 and a data driver 430. The display panel 410 may include first to fourth pixels PX1, PX2, PX3, and PX4 disposed in one pixel row PXR, first and second gate lines GL1 and GL2, and first to fourth data lines DL1, DL2, DL3, and DL4.

The first to fourth pixels PX1, PX2, PX3, and PX4 may be arranged along a first direction DR1. The first pixel PX1, the second pixel PX2, and the third pixel PX3 may emit light of different colors from each other. The first pixel PX1 may emit light of a first color (e.g., red), the second pixel PX2 may emit light of a second color (e.g., green), and the third pixel PX3 may emit light of a third color (e.g., blue). The fourth pixel PX4 may emit light of the same color as the first pixel PX1.

The first and second gate lines GL1 and GL2 may extend in the first direction DR1. The first gate line GL1 may be connected to the first pixel PX1 and the third pixel PX3, and the second gate line GL2 may be connected to the second pixel PX2 and the fourth pixel PX4.

The first to fourth data lines DL1, DL2, DL3, and DL4 may extend in a second direction DR2. The second direction DR2 may cross the first direction DR1. The first to fourth data lines DL1, DL2, DL3, and DL4 may be connected to the first to fourth pixels PX1, PX2, PX3, and PX4, respectively. The first to fourth data lines DL1, DL2, DL3, and DL4 may be arranged along the first direction DR1.

The data driver 430 may be disposed adjacent to a first side of the display panel 410. The first side of the display panel 410 may be positioned in the second direction DR2 from a display area of the display panel 410 in which the pixels PX1, PX2, PX3, and PX4 are disposed. The data driver 430 may include first and second amplifiers AMP1 and AMP2. The first amplifier AMP1 may be connected to the first data line DL1, and the second amplifier AMP2 may be connected to the third data line DL3. The first amplifier AMP1 may output a first data signal DS1 to the first data line DL1, and the second amplifier AMP2 may output a second data signal DS2 to the third data line DL3. The first data signal DS1 may include a first voltage corresponding to the first color and a second voltage corresponding to the second color, and the second data signal DS2 may include a third voltage corresponding to the third color and a first voltage corresponding to the first color.

The first data line DL1 and the second data line DL2 may be connected to each other at a second side of the display panel 410. Accordingly, the first data line DL1 and the second data line DL2, which are adjacent to each other, may be connected to each other. The second side of the display panel 410 may be opposite to the first side of the display panel 410 with the display area of the display panel 410 interposed therebetween. The second side of the display panel 410 may be positioned in a third direction DR3 from the display area of the display panel 410. The third direction DR3 may be opposite to the second direction DR2. The third data line DL3 and the fourth data line DL4 may be connected to each other at the second side of the display panel 410. Accordingly, the third data line DL3 and the fourth data line DL4, which are adjacent to each other, may be connected to each other.

Figure 5:
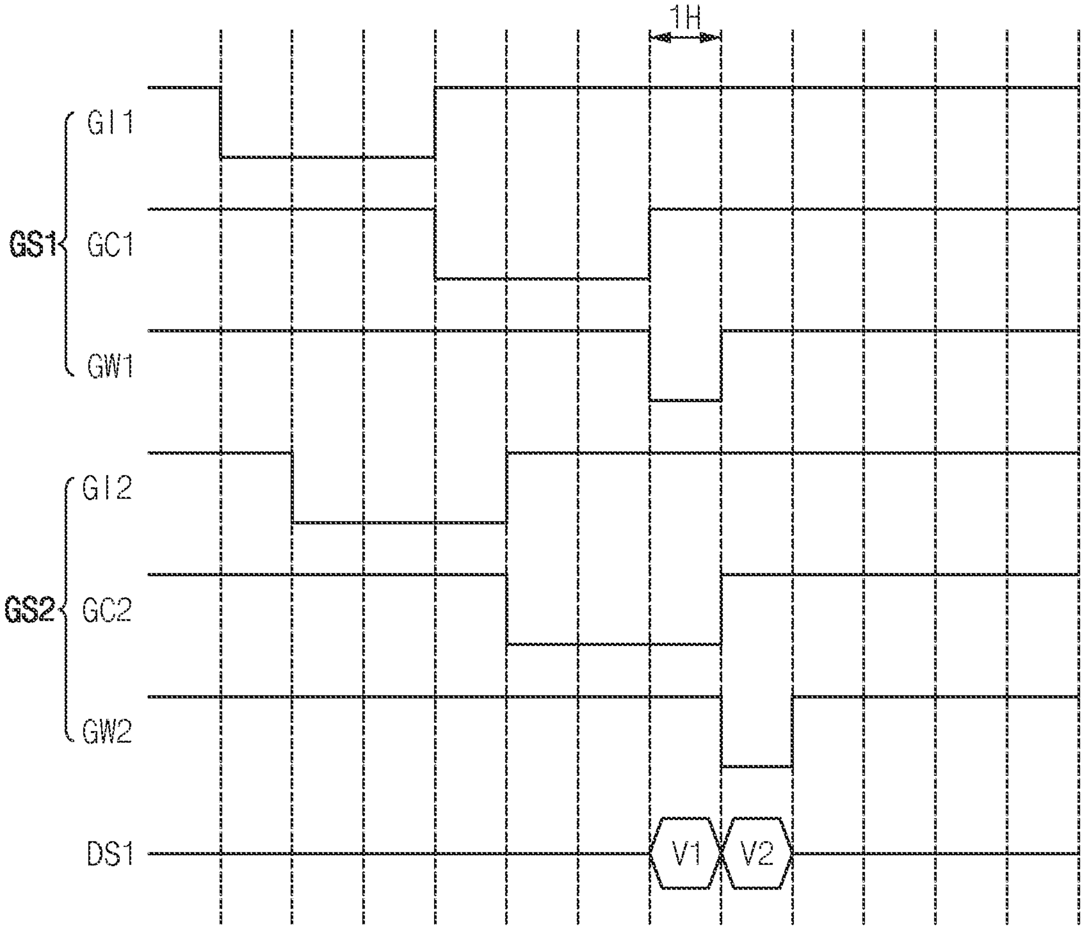
FIG. 5 is a signal timing diagram illustrating operations of pixels of the display device in FIG. 4.

FIG. 5 is a signal timing diagram illustrating operations of pixels of the display device 400 in FIG. 4. FIG. 5 may illustrate signals provided to the first and second pixels PX1 and PX2.

Referring to FIGS. 4 and 5, the first gate line GL1 and the second gate line GL2 may transmit a first gate signal GS1 and a second gate signal GS2, respectively. The first gate signal GS1 may include a first write gate signal GW1, a first compensation gate signal GC1, and a first initialization gate signal GI1, and the second gate signal GS2 may include a second write gate signal GW2, a second compensation gate signal GC2, and a second initialization gate signal GI2. Although not illustrated in FIG. 5, the first gate signal GS1 and the second gate signal GS2 may further include a first bypass gate signal and a second bypass gate signal, respectively.

A driving frequency of the gate driver may be twice an image refresh rate (or refresh rate) of the display device 400. In an embodiment, for example, when the image refresh rate of the display device 400 is 120 hertz (Hz), the driving frequency of the gate driver may be 240 Hz.

In an embodiment, the second gate signal GS2 may be a signal obtained by shifting the first gate signal GS1 by one horizontal time (1H). In such an embodiment, the second write gate signal GW2 may be a signal obtained by shifting the first write gate signal GW1 by one horizontal time (1H), the second compensation gate signal GC2 may be a signal obtained by shifting the first compensation gate signal GC1 by one horizontal time (1H), and the second initialization gate signal GI2 may be a signal obtained by shifting the first initialization gate signal GI1 by one horizontal time (1H).

In an alternative embodiment, the second write gate signal GW2 may be a signal obtained by shifting the first write gate signal GW1 by one horizontal time (1H), and the second compensation gate signal GC2 may be the same signal as the first compensation gate signal GC1, and the second initialization gate signal GI2 may be the same signal as the first initialization gate signal GI1.

While the first write gate signal GW1 has a pulse having the gate-on voltage level, the first data signal DS1 may have a first voltage V1 corresponding to the first color, and the first voltage V1 may be written in the first pixel PX1. While the second write gate signal GW2 has a pulse having the gate-on voltage level, the first data signal DS1 may have a second voltage V2 corresponding to the second color, and the second voltage V2 may be written in the second pixel PX2. Accordingly, although the first pixel PX1 and the second pixel PX2 receive a same data signal as each other, i.e., the first data signal DS1 through the first data line DL1, the first voltage V1 and the second voltage V2 may be written in the first pixel PX1 and the second pixel PX2, respectively. Accordingly, the display device 400 may normally operate.

In an embodiment of the display device 400, as described with reference to FIGS. 4 and 5, two adjacent data lines may be connected to each other, and only one data line of the connected two data lines may be connected to an amplifier. Thus, in such an embodiment, the number of amplifiers may be half of the number of data lines. Accordingly, the number of amplifiers included in the data driver 430 may decrease, and the number of integrated circuits in which the data driver 430 is implemented may decrease.

Figure 6:
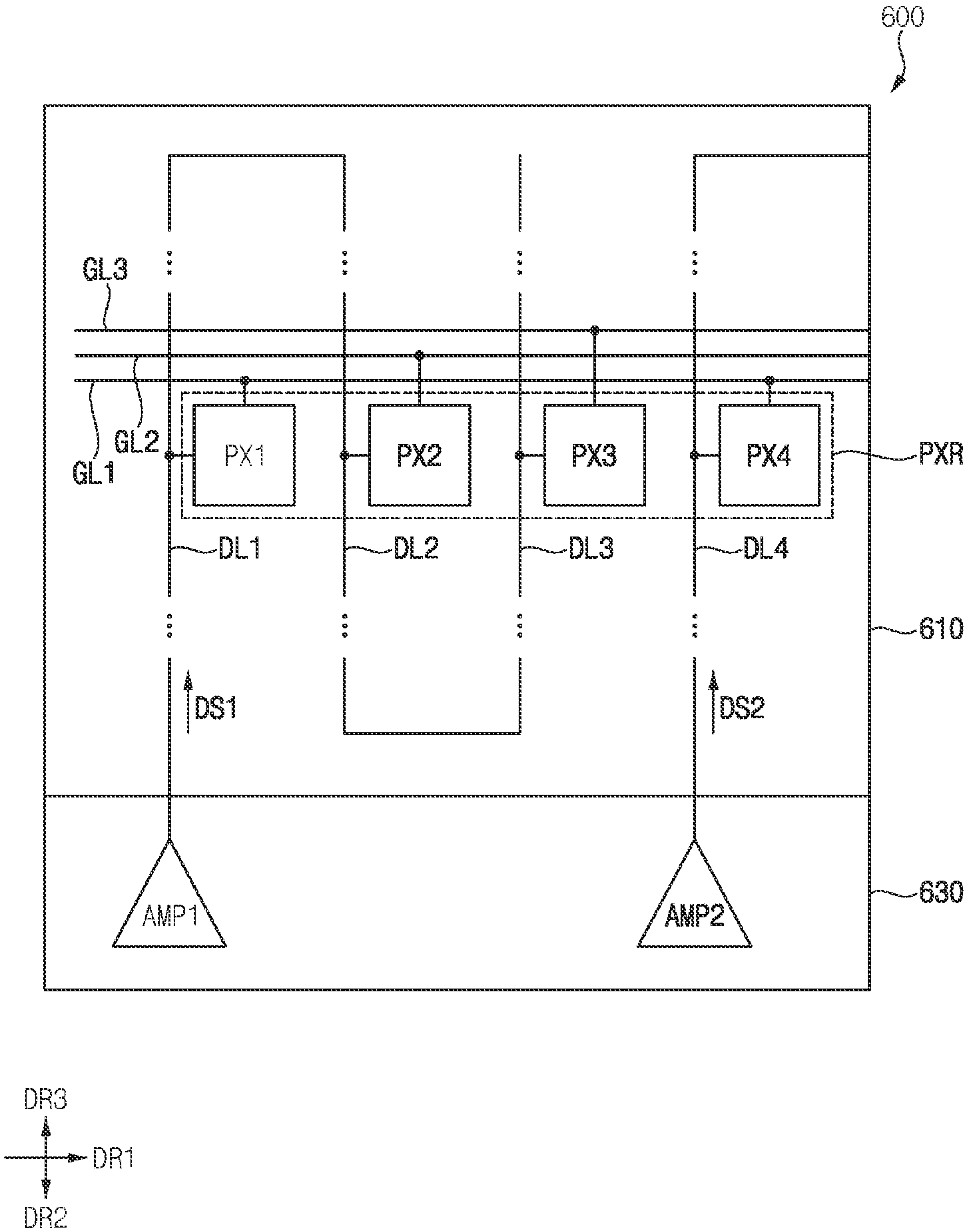
FIG. 6 is a plan view illustrating a portion of a display device according to an embodiment.

FIG. 6 is a plan view illustrating a portion of a display device 600 according to an embodiment.

Referring to FIG. 6, an embodiment of the display device 600 may include a display panel 610 and a data driver 630. Any repetitive detailed descriptions of components of the display device 600 shown in FIG. 6, which are substantially the same as or similar to those of the display device 400 described above with reference to FIG. 4, will be omitted.

The display panel 610 may include first to fourth pixels PX1, PX2, PX3, and PX4 disposed in one pixel row PXR, first to third gate lines GL1, GL2, and GL3, and first to fourth data lines DL1, DL2, DL3, and DL4.

The first to third gate lines GL1, GL2, and GL3 may extend in the first direction DR1. The first gate line GL1 may be connected to the first pixel PX1 and the fourth pixel PX4, the second gate line GL2 may be connected to the second pixel PX2, and the third gate line GL3 may be connected to the third pixel PX3.

The data driver 630 may be disposed adjacent to the first side of the display panel 610. The data driver 630 may include first and second amplifiers AMP1 and AMP2. The first amplifier AMP1 may be connected to the first data line DL1, and the second amplifier AMP2 may be connected to the fourth data line DL4. The first amplifier AMP1 may output a first data signal DS1 to the first data line DL1, and the second amplifier AMP2 may output a second data signal DS2 to the fourth data line DL4. Each of the first data signal DS1 and the second data signal DS2 may include a first voltage corresponding to the first color, a second voltage corresponding to the second color, and a third voltage corresponding to the third color.

The first data line DL1 and the second data line DL2 may be connected to each other at the second side of the display panel 610, and the second data line DL2 and the third data line DL3 may be connected to each other at the first side of the display panel 610. Accordingly, the first data line DL1, the second data line DL2, and the third data line DL3, which are adjacent to each other, may be connected to each other.

Figure 7:
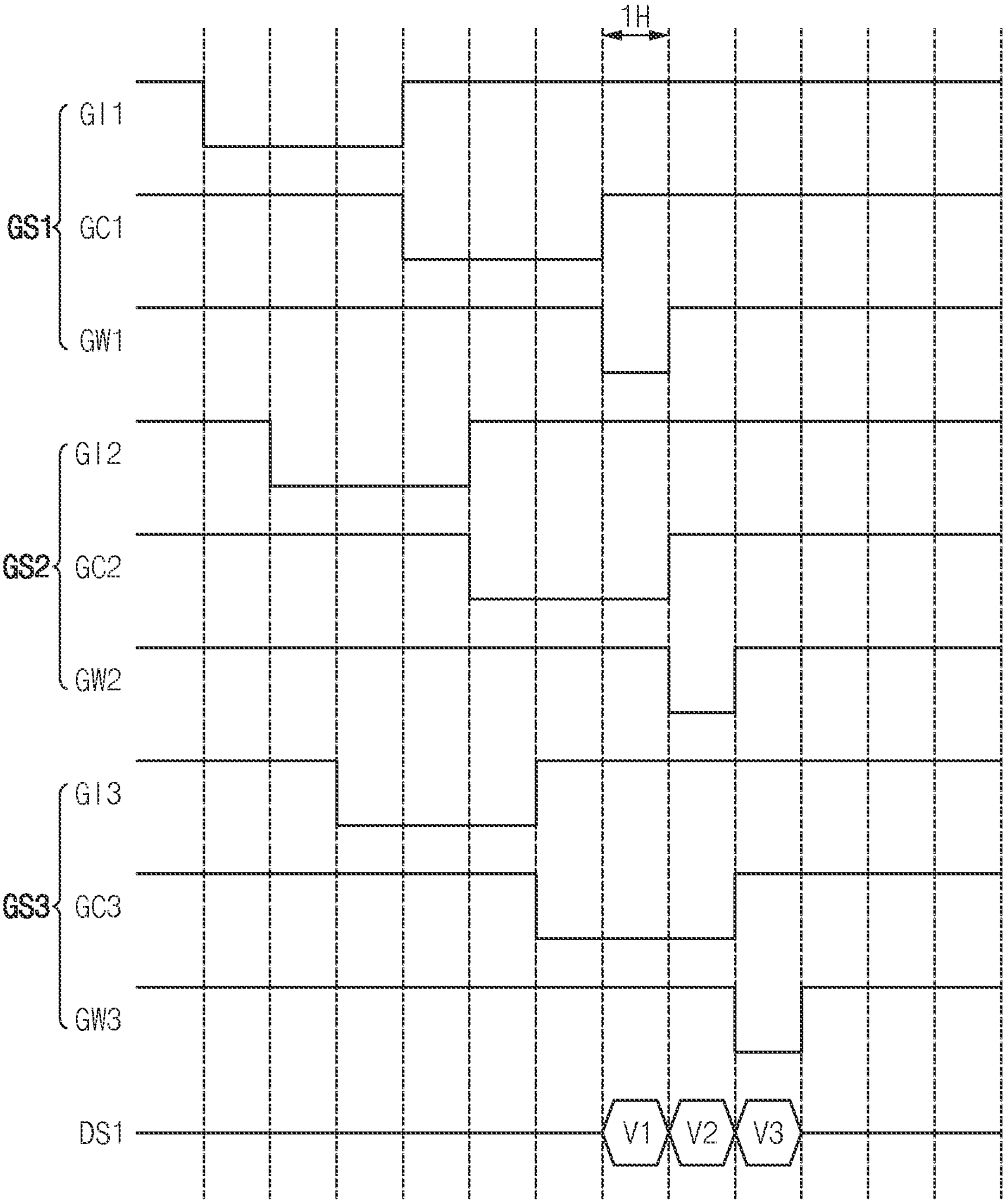
FIG. 7 is a signal timing diagram illustrating operations of pixels of the display device in FIG. 6.

FIG. 7 is a signal timing diagram illustrating operations of pixels of the display device 600 in FIG. 6. FIG. 7 may illustrate signals provided to the first to third pixels PX1, PX2, and PX3. Any repetitive detailed descriptions of the operations of the pixels of the display device 600 shown in FIGS. 6 and 7, which are substantially the same as or similar to those of the pixels of the display device 400 described above with reference to FIGS. 4 and 5, will be omitted.

Referring to FIGS. 6 and 7, the third gate line GL3 may transmit a third gate signal GS3. The third gate signal GS3 may include a third write gate signal GW3, a third compensation gate signal GC3, and a third initialization gate signal GI3. Although not illustrated in FIG. 7, the third gate signal GS3 may further include a third bypass gate signal.

The driving frequency of the gate driver may be three times the image refresh rate of the display device 600. In an embodiment, for example, when the image refresh rate of the display device 600 is 120 Hz, the driving frequency of the gate driver may be 360 Hz.

In an embodiment, the third gate signal GS3 may be a signal obtained by shifting the second gate signal GS2 by one horizontal time (1H). In other words, the third gate signal GS3 may be a signal obtained by shifting the first gate signal GS1 by two horizontal times (2H). In such an embodiment, the third write gate signal GW3 may be a signal obtained by shifting the second write gate signal GW2 by one horizontal time (1H), the third compensation gate signal GC3 may be a signal obtained by shifting the second compensation gate signal GC2 by one horizontal time (1H), and the third initialization gate signal GI3 may be a signal obtained by shifting the second initialization gate signal GI2 by one horizontal time (1H).

In an alternative embodiment, the third write gate signal GW3 may be a signal obtained by shifting the second write gate signal GW2 by one horizontal time (1H), and the first to third compensation gate signals GC1, GC2, and GC3 may be the same signal, and the first to third initialization gate signals GI1, GI2, and GI3 may be the same signal.

While the third write gate signal GW3 has a pulse having the gate-on voltage level, the first data signal DS1 may have a third voltage V3 corresponding to the third color, and the third voltage V3 may be written in the third pixel PX3. Accordingly, although the first pixel PX1, the second pixel PX2, and the third pixel PX3 receive a same data signal as each other, i.e., the first data signal DS1 through the first data line DL1, the first voltage V1, the second voltage V2, and the third voltage V3 may be written in the first pixel PX1, the second pixel PX2, and the third pixel PX3, respectively. Accordingly, the display device 600 may normally operate.

In an embodiment of the display device 600, as described with reference to FIGS. 6 and 7, three adjacent data lines may be connected to each other, and only one data line among the connected three data lines may be connected to an amplifier. Thus, the number of amplifiers may be ⅓ of the number of data lines. Accordingly, the number of amplifiers included in the data driver 630 may decrease, and the number of integrated circuits in which the data driver 630 is implemented may decrease.

Figure 8:
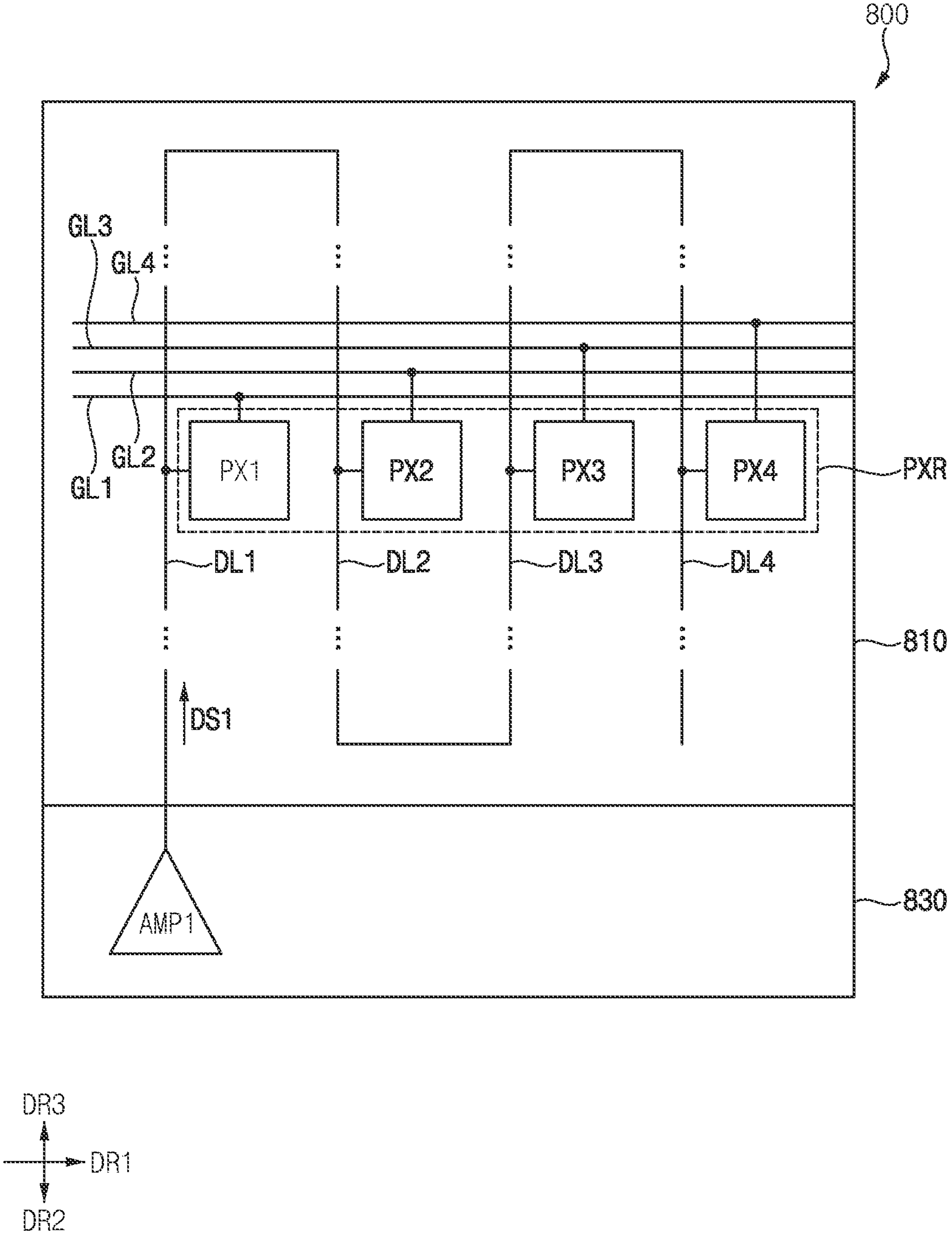
FIG. 8 is a plan view illustrating a portion of a display device according to an embodiment.

FIG. 8 is a plan view illustrating a portion of a display device 800 according to an embodiment.

Referring to FIG. 8, an embodiment of the display device 800 may include a display panel 810 and a data driver 830. Any repetitive detailed descriptions of components of the display device 800 described with reference to FIG. 8, which are substantially the same as or similar to those of the display device 400 described with reference to FIG. 4 and the display device 600 described above with reference to FIG. 6, will be omitted.

The display panel 810 may include first to fourth pixels PX1, PX2, PX3, and PX4 disposed in one pixel row PXR, first to fourth gate lines GL1, GL2, GL3, and GL4, and first to fourth data lines DL1, DL2, DL3, and DL4.

The first to fourth gate lines GL1, GL2, GL3, and GL4 may extend in the first direction DR1. The first gate line GL1 may be connected to the first pixel PX1, the second gate line GL2 may be connected to the second pixel PX2, the third gate line GL3 may be connected to the third pixel PX3, and the fourth gate line GL4 may be connected to the fourth pixel PX4.

The data driver 830 may be disposed on the first side of the display panel 810. The data driver 830 may include a first amplifier AMP1. The first amplifier AMP1 may be connected to the first data line DL1. The first amplifier AMP1 may output a first data signal DS1 to the first data line DL1. The first data signal DS1 may include first voltages corresponding to the first color, a second voltage corresponding to the second color, and a third voltage corresponding to the third color.

The first data line DL1 and the second data line DL2 may be connected to each other at the second side of the display panel 610, the second data line DL2 and the third data line DL3 may be connected to each other at the first side of the display panel 610, and the third data line DL3 and the fourth data line DL4 may be connected to each other at the second side of the display panel 610. Accordingly, the first data line DL1, the second data line DL2, the third data line DL3, and the fourth data line DL4, which are adjacent to each other, may be connected.

Figure 9:
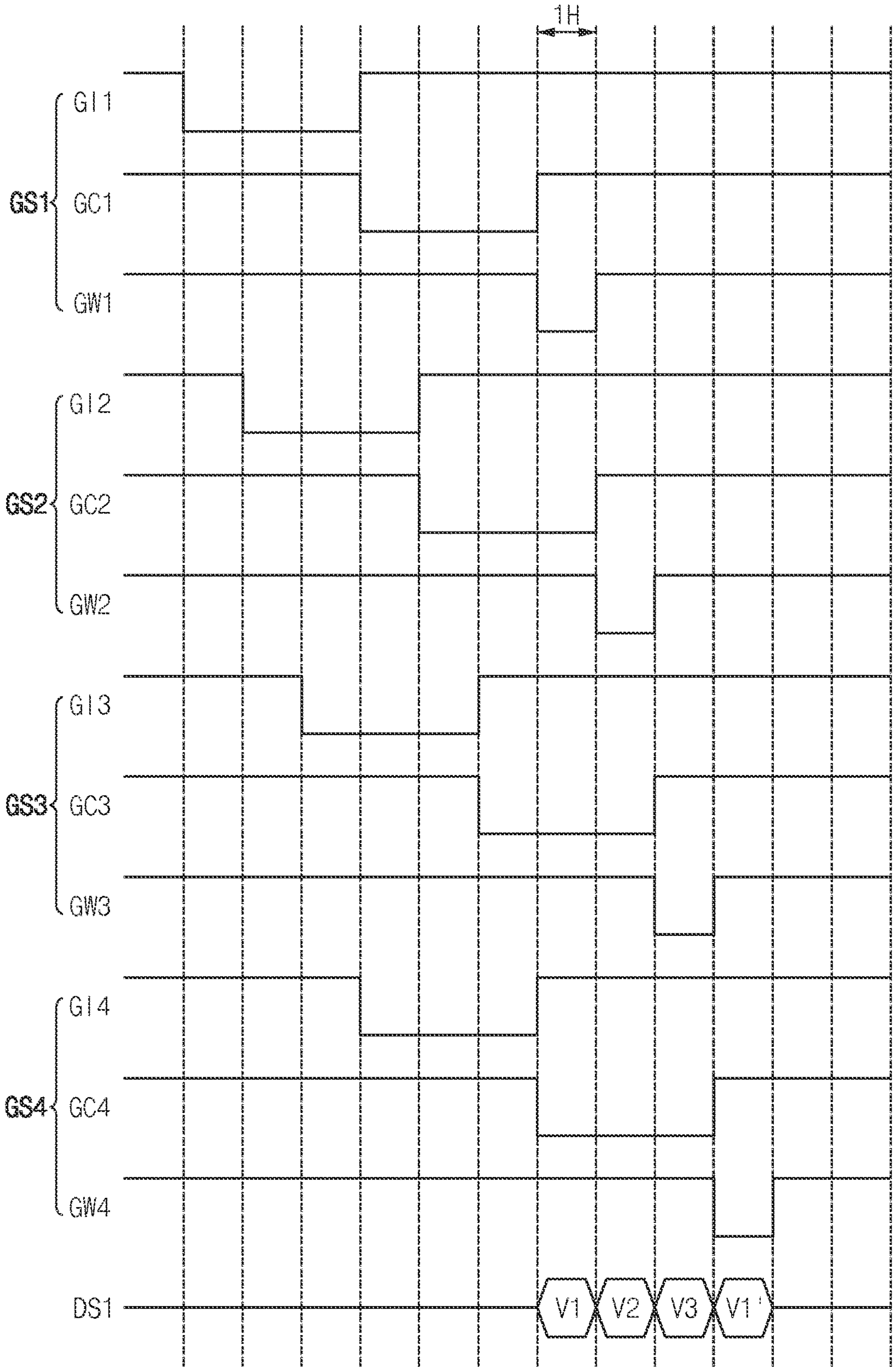
FIG. 9 is a signal timing diagram illustrating operations of pixels of the display device in FIG. 8.

FIG. 9 is a signal timing diagram illustrating operations of pixels of the display device 800 in FIG. 8. FIG. 9 may illustrate signals provided to the first to fourth pixels PX1, PX2, PX3, and PX4. Any repetitive detailed description of the operations of the pixels of the display device 800 shown in FIGS. 8 and 9, which are substantially the same as or similar to those of the pixels of the display device 600 described above with reference to FIGS. 6 and 7, will be omitted.

Referring to FIGS. 8 and 9, the fourth gate line GL4 may transmit a fourth gate signal GS4. The fourth gate signal GS4 may include a fourth write gate signal GW4, a fourth compensation gate signal GC4, and a fourth initialization gate signal GI4. Although not illustrated in FIG. 9, the fourth gate signal GS4 may further include a fourth bypass gate signal.

The driving frequency of the gate driver may be four times the image refresh rate of the display device 800. In an embodiment, for example, when the image refresh rate of the display device 800 is 120 Hz, the driving frequency of the gate driver may be 480 Hz.

In an embodiment, the fourth gate signal GS4 may be a signal obtained by shifting the third gate signal GS3 by one horizontal time (1H). In other words, the fourth gate signal GS4 may be a signal obtained by shifting the first gate signal GS1 by three horizontal times (3H). In such an e embodiment, the fourth write gate signal GW4 may be a signal obtained by shifting the third write gate signal GW3 by one horizontal time (1H), the fourth compensation gate signal GC4 may be a signal obtained by shifting the third compensation gate signal GC3 by one horizontal time (1H), and the fourth initialization gate signal GI4 may be a signal obtained by shifting the third initialization gate signal GI3 by one horizontal time (1H).

In an alternative embodiment, the fourth write gate signal GW4 may be a signal obtained by shifting the third write gate signal GW3 by one horizontal time (1H), and the first to fourth compensation gate signals GC1, GC2, GC3, and GC4 may be the same signal, and the first to fourth initialization gate signals GI1, GI2, GI3, and GI4 may be the same signal.

While the fourth write gate signal GW4 has a pulse having the gate-on voltage level, the first data signal DS1 may have a first voltage V1' corresponding to the first color, and the first voltage V1' may be written in the fourth pixel PX4. The first voltage V1' may be different from the first voltage V1. Accordingly, although the first pixel PX1, the second pixel PX2, the third pixel PX3, and the fourth pixel PX4 receive a same data signal as each other, i.e., the first data signal DS1 through the first data line DL1, the first voltage V1, the second voltage V2, the third voltage V3, and the first voltage V1' may be written in the first pixel PX1, the second pixel PX2, the third pixel PX3, and the fourth pixel PX4, respectively. Accordingly, the display device 800 may normally operate.

In an embodiment of the display device 800, as described with reference to FIGS. 8 and 9, four adjacent data lines may be connected to each other, and only one data line among the connected four data lines may be connected to an amplifier. Thus, the number of amplifiers may be ¼ of the number of data lines. Accordingly, the number of amplifiers included in the data driver 830 may decrease, and the number of integrated circuits in which the data driver 830 is implemented may decrease.

Embodiments in which two to four adjacent data lines are connected have been described with reference to FIGS. 4 to 9. However, the disclosure is not limited thereto, and five or more adjacent data lines may be connected to each other.

Figure 10:
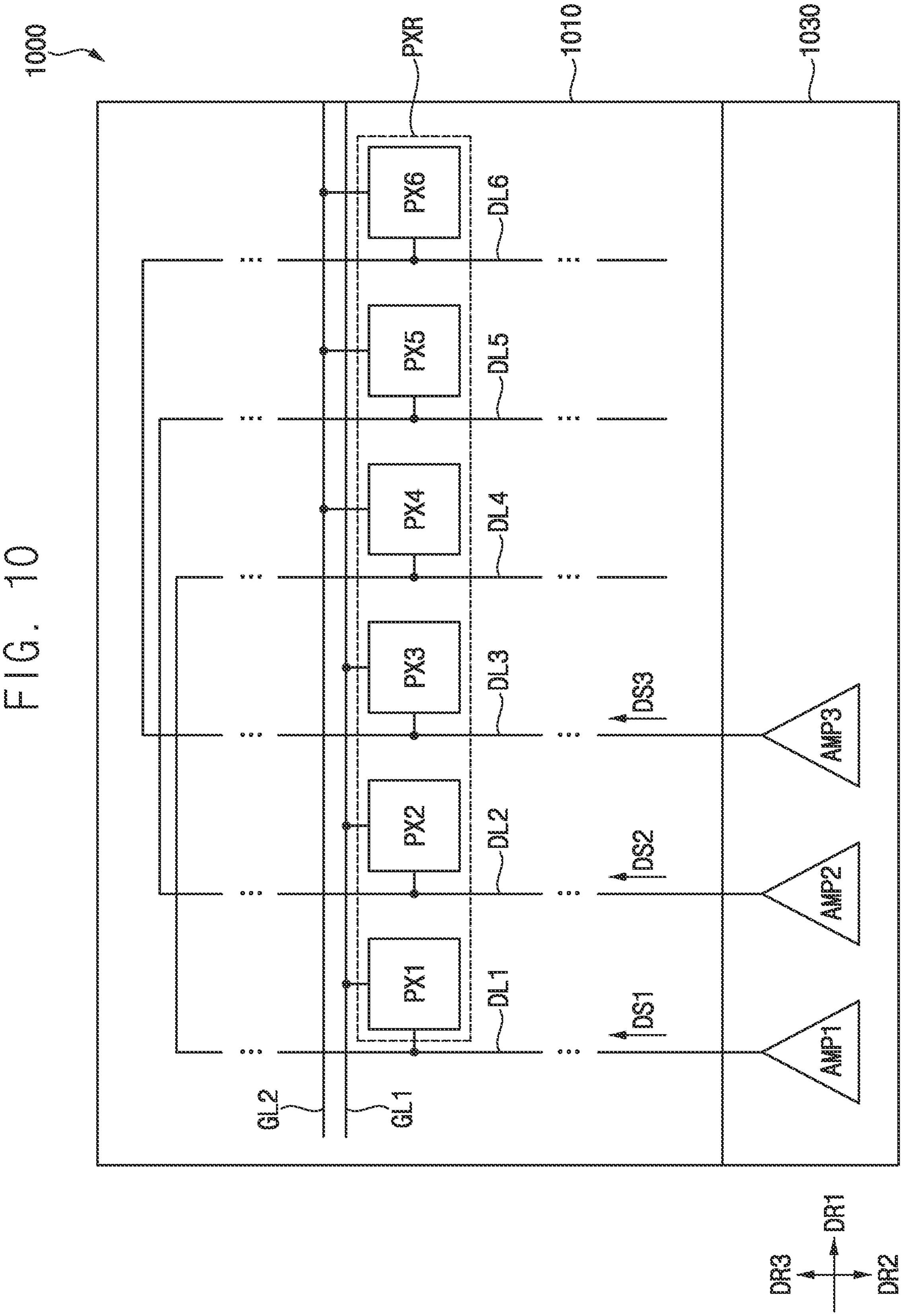
FIG. 10 is a plan view illustrating a portion of a display device according to an embodiment.

FIG. 10 is a plan view illustrating a portion of a display device 1000 according to an embodiment.

Referring to FIG. 10, an embodiment of the display device 1000 may include a display panel 1010 and a data driver 1030. Any repetitive detailed descriptions of components of the display device 1000 shown in FIG. 10, which are substantially the same as or similar to those of the display device 400 described above with reference to FIG. 4, will be omitted.

The display panel 1010 may include first to sixth pixels PX1, PX2, PX3, PX4, PX5, and PX6 disposed in one pixel row PXR, first and second gate lines GL1 and GL2, and first to sixth data lines DL1, DL2, DL3, DL4, DL5, and DL6.

The first to sixth pixels PX1, PX2, PX3, PX4, PX5, and PX6 may be arranged along the first direction DR1. The first pixel PX1, the second pixel PX2, and the third pixel PX3 may emit light of different colors from each other. The first pixel PX1 may emit light of a first color (e.g., red), the second pixel PX2 may emit light of a second color (e.g., green), and the third pixel PX3 may emit light of a third color (e.g., blue). The fourth pixel PX4 may emit light of the same color as the first pixel PX1, the fifth pixel PX5 may emit light of the same color as the second pixel PX2, and the sixth pixel PX6 may emit light of the same color as the third pixel PX3.

The first and second gate lines GL1 and GL2 may extend in the first direction DR1. The first gate line GL1 may be connected to the first pixel PX1, the second pixel PX2, and the third pixel PX3, and the second gate line GL2 may be connected to the fourth pixel PX4, the fifth pixel PX5, and the sixth pixel PX6.

The first to sixth data lines DL1, DL2, DL3, DL4, DL5, and DL6 may extend in the second direction DR2. The first to sixth data lines DL1, DL2, DL3, DL4, DL5, and DL6 may be connected to the first to sixth pixels PX1, PX2, PX3, PX4, PX5, and PX6, respectively. The first to sixth data lines DL1, DL2, DL3, DL4, DL5, and DL6 may be arranged along the first direction DR1.

The data driver 1030 may be disposed adjacent to the first side of the display panel 1010. The data driver 1030 may include first to third amplifiers AMP1, AMP2, and AMP3. The first amplifier AMP1 may be connected to the first data line DL1, the second amplifier AMP2 may be connected to the second data line DL2, and the third amplifier AMP3 may be connected to the third data line DL3. The first amplifier AMP1 may output a first data signal DS1 to the first data line DL1, and the second amplifier AMP2 may output a second data signal DS2 to the second data line DL2, and the third amplifier AMP3 may output a third data signal DS3 to the third data line DL3. The first data signal DS1 may include first voltages corresponding to the first color, the second data signal DS2 may include second voltages corresponding to the second color, and a third data signal DS3 may include third voltages corresponding to the third color.

At least two data lines among the data lines may be connected to each other at the second side of the display panel 1010. The first data line DL1 and the fourth data line DL4 may be connected to each other at the second side of the display panel 1010. Accordingly, the first data line DL1 and the fourth data line DL4 respectively connected to the first pixel PX1 and the fourth pixel PX4 that emit light of the same color (e.g., red) may be connected. The second data line DL2 and the fifth data line DL5 may be connected to each other at the second side of the display panel 1010. Accordingly, the second data line DL2 and the fifth data line DL5 respectively connected to the second pixel PX2 and the fifth pixel PX5 that emit light of the same color (e.g., green) may be connected to each other. The third data line DL3 and the sixth data line DL6 may be connected to each other at the second side of the display panel 1010. Accordingly, the third data line DL3 and the sixth data line DL6 respectively connected to the third pixel PX3 and the sixth pixel PX6 that emit light of the same color (e.g., blue) may be connected to each other.

Figure 11:
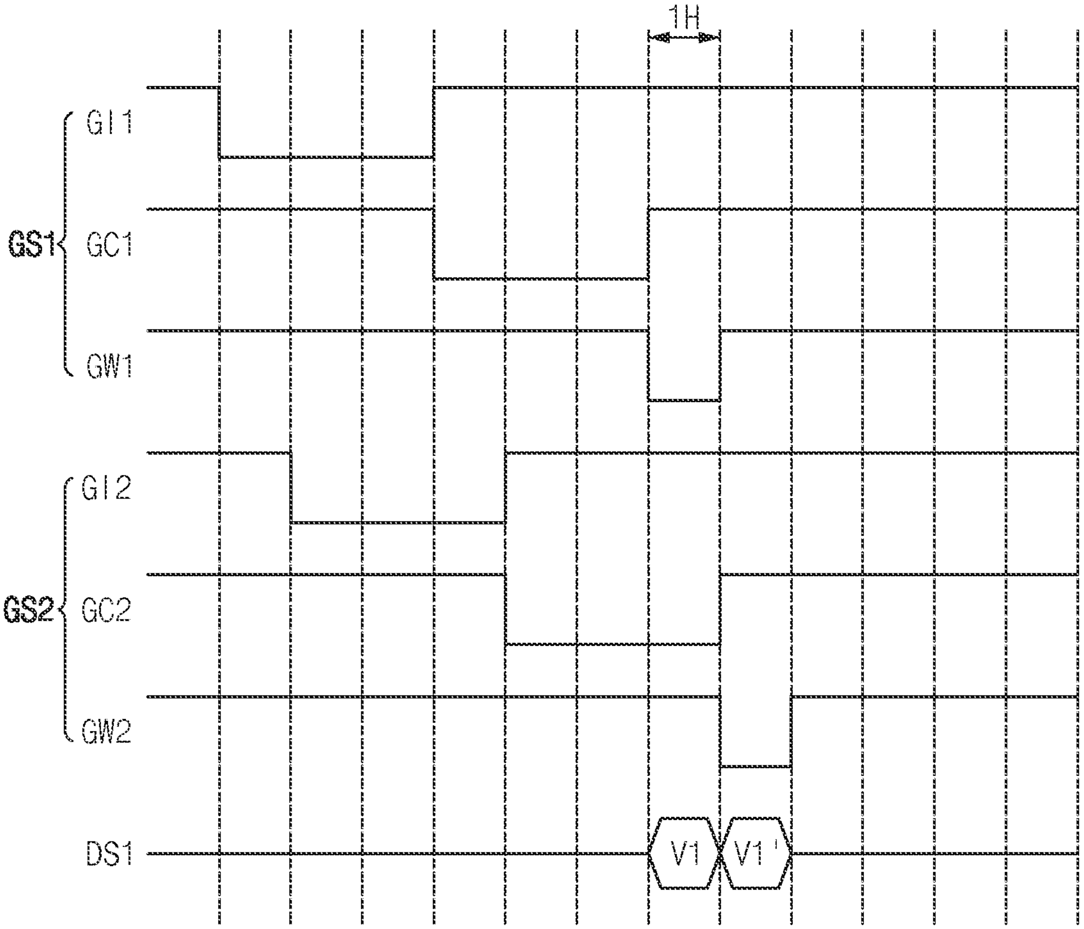
FIG. 11 is a signal timing diagram illustrating operations of pixels of the display device in FIG. 10.

FIG. 11 is a signal timing diagram illustrating operations of pixels of the display device 1000 in FIG. 10. FIG. 11 may illustrate signals provided to the first and fourth pixels PX1 and PX4. Any repetitive detailed descriptions of the operations of the pixels of the display device 1000 shown in FIGS. 10 and 11, which are substantially the same as or similar to those of the pixels of the display device 400 described above with reference to FIGS. 4 and 5, will be omitted.

Referring to FIGS. 10 and 11, while the first write gate signal GW1 has a pulse having the gate-on voltage level, the first data signal DS1 may have a first voltage V1 corresponding to the first color, and the first voltage V1 may be written in the first pixel PX1. While the second write gate signal GW2 has a pulse having the gate-on voltage level, the first data signal DS1 may have a first voltage V1' corresponding to the first color, and the first voltage V1' may be written in the fourth pixel PX4. The first voltage V1' may be different from the first voltage V1. Accordingly, although the first pixel PX1 and the fourth pixel PX4 receive a same data signal as each other, i.e., the first data signal DS1 through the first data line DL1, the first voltage V1 and the first voltage V1' may be written in the first pixel PX1 and the fourth pixel PX4, respectively. Accordingly, the display device 1000 may normally operate.

In an embodiment of the display device 1000, as described with reference to FIGS. 10 and 11, data lines respectively connected to pixels that emit light of a same color as each other may be connected to each other, and only one data line of the connected data lines may be connected to an amplifier. Thus, the number of amplifiers may be less than or equal to half of the number of data lines. Accordingly, the number of amplifiers included in the data driver 1030 may decrease, and the number of integrated circuits in which the data driver 1030 is implemented may decrease. In such an embodiment, as the amplifier is connected to pixels that emit light of a same color as each other, data toggle of the amplifier may decrease, and power consumption of the data driver 1030 may be reduced.

Figure 12:
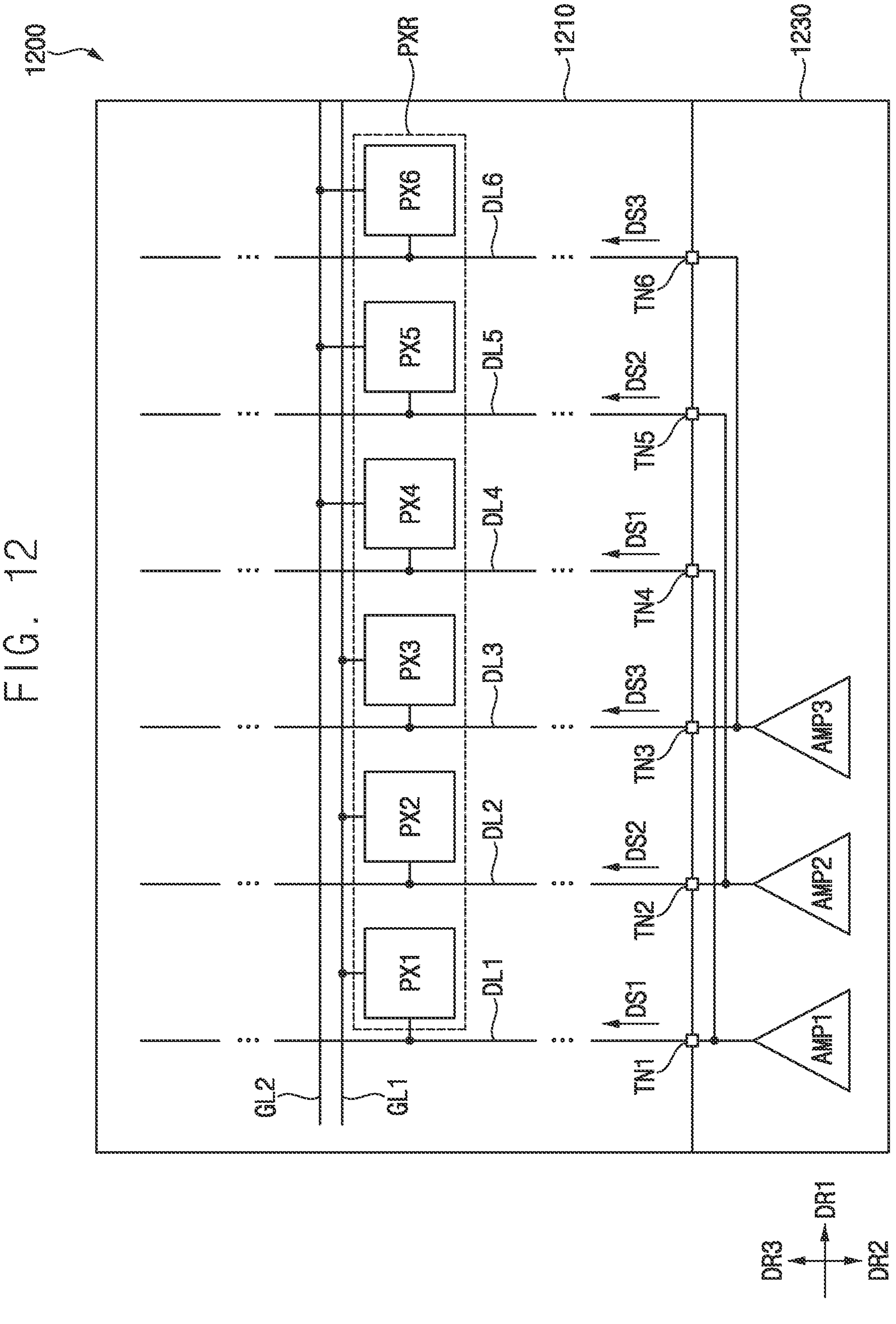
FIG. 12 is a plan view illustrating a portion of a display device according to an embodiment.

FIG. 12 is a plan view illustrating a portion of a display device 1200 according to an embodiment.

Referring to FIG. 12, an embodiment of the display device 1200 may include a display panel 1210 and a data driver 1230. Any repetitive detailed descriptions of components of the display device 1200 shown in FIG. 12, which are substantially the same as or similar to those of the display device 1000 described above with reference to FIG. 10, will be omitted.

The data driver 1230 may be disposed adjacent to the first side of the display panel 1210. The data driver 1230 may include first to sixth terminals TN1, TN2, TN3, TN4, TN5, and TN6 and first to third amplifiers AMP1, AMP2, and AMP3. The first to sixth terminals TN1, TN2, TN3, TN4, TN5, and TN6 may be connected to the first to sixth data lines DL1, DL2, DL3, DL4, DL5, and DL6, respectively. The first amplifier AMP1 may output a first data signal DS1, the second amplifier AMP2 may output a second data signal DS2, and the third amplifier AMP3 may output a third data signal DS3. The first data signal DS1 may include first voltages corresponding to the first color, the second data signal DS2 may include second voltages corresponding to the second color, and a third data signal DS3 may include third voltages corresponding to the third color.

At least two terminals of the terminals may be connected to only one amplifier of the amplifiers inside the data driver 1230. The first terminal TN1 and the fourth terminal TN4 may be connected to the first amplifier AMP1 inside the data driver 1230. Accordingly, the first data line DL1 and the fourth data line DL4 respectively connected to the first pixel PX1 and the fourth pixel PX4 that emit light of the same color (e.g., red) may be connected to each other. The second terminal TN2 and the fifth terminal TN5 may be connected to the second amplifier AMP2 inside the data driver 1230. Accordingly, the second data line DL2 and the fifth data line DL5 respectively connected to the second pixel PX2 and the fifth pixel PX5 that emit light of the same color (e.g., green) may be connected to each other. The third terminal TN3 and the sixth terminal TN6 may be connected to the third amplifier AMP3 inside the data driver 1230. Accordingly, the third data line DL3 and the sixth data line DL6 respectively connected to the third pixel PX3 and the sixth pixel PX6 that emit light of the same color (e.g., blue) may be connected to each other.

In an embodiment of the display device 1200, as described with reference to FIG. 12, terminals respectively connected to pixels that emit light of the same color as each other through data lines may be connected to one amplifier. Thus, the number of amplifiers may be less than or equal to half of the number of data lines. Accordingly, the number of amplifiers included in the data driver 1230 may decrease, and the number of integrated circuits in which the data driver 1230 is implemented may decrease. In such an embodiment, as the amplifier is connected to pixels that emit light of the same color, data toggle of the amplifier may be decrease, and power consumption of the data driver 1230 may be reduced.

Figure 13:
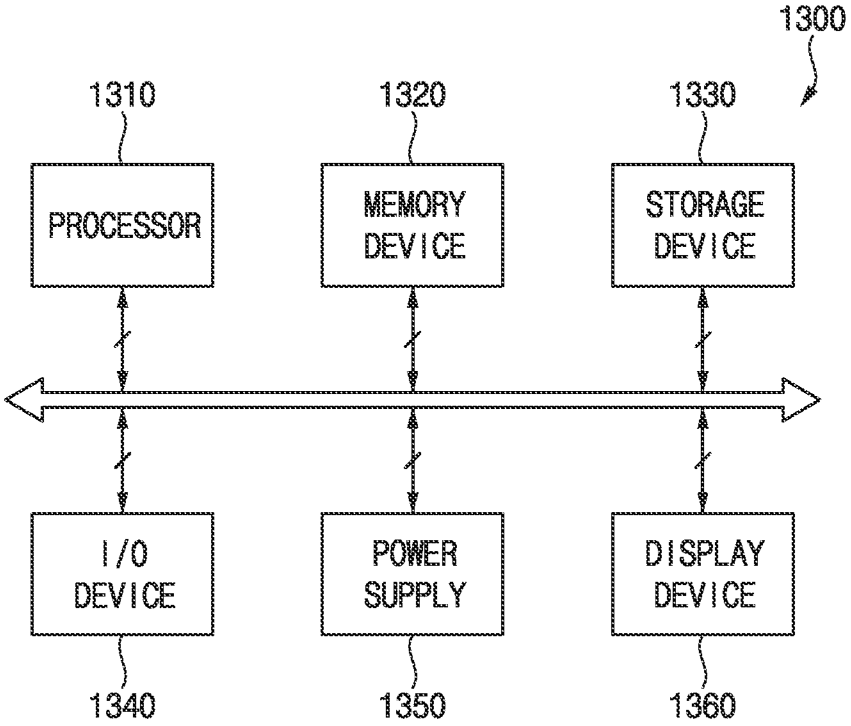
FIG. 13 is a block diagram illustrating an electronic apparatus including a display device according to an embodiment.

FIG. 13 is a block diagram illustrating an electronic apparatus 1300 including a display device 1360 according to an embodiment.

Referring to FIG. 13, an embodiment of the electronic apparatus 1300 may include a processor 1310, a memory device 1320, a storage device 1330, an input/output ("I/O") device 1340, a power supply 1350, and the display device 1360. The display device 1360 may correspond to the display device 100 in FIG. 1. The electronic apparatus 1300 may further include a plurality of ports for communicating with a video card, a sound card, a memory card, a universal serial bus ("USB") device, etc.

The processor 1310 may perform particular calculations or tasks. In an embodiment, the processor 1310 may be a microprocessor, a central processing unit ("CPU"), or the like. The processor 1310 may be coupled to other components via an address bus, a control bus, a data bus, or the like. In an embodiment, the processor 1310 may be coupled to an extended bus such as a peripheral component interconnection ("PCI") bus.

The memory device 1320 may store data for operations of the electronic apparatus 1300. In an embodiment, the memory device 1320 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1330 may include a solid state drive ("SSD") device, a hard disk drive ("HDD") device, a CD-ROM device, or the like. The I/O device 1340 may include an input device such as a keyboard, a keypad, a touchpad, a touch-screen, a mouse device, etc., and an output device such as a speaker, a printer, etc. The power supply 1350 may supply a power required for the operation of the electronic apparatus 1300. The display device 1360 may be coupled to other components via the buses or other communication links.

In an embodiment of the display device 1360, at least two data lines may be connected to each other at a side opposite to a side of a display panel adjacent to a data driver, or may be connected to each other inside the data driver, so that the number of channels of the data driver may decrease without using a demultiplexer. Accordingly, power consumption of the display device may be reduced, and a dead space of the display device may decrease.

The display device according to the embodiments may be applied to a display device included in a computer, a notebook, a mobile phone, a smart phone, a smart pad, a personal media player ("PMP"), a personal digital assistant ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device, comprising:

a display panel which includes a first pixel, a second pixel and a third pixel disposed in one pixel row, a first gate line connected to the first pixel, a second gate line connected to the second pixel and parallel to the first gate line, a first data line connected to the first pixel and crossing the first gate line, a second data line connected to the second pixel and parallel to the first data line, a third gate line connected to the third pixel and parallel to the first gate line, and a third data line connected to the third pixel and parallel to the first data line;

a gate driver which provides a first gate signal and a second gate signal to the first gate line and the second gate line, respectively; and a data driver disposed adjacent to a first side of the display panel, wherein the data driver provides a data signal to the first data line, wherein the first data line and the second data line are connected to each other in series at a second side of the display panel opposite to the first side of the display panel, and wherein the second data line and the third data line are connected to each other in series at the first side of the display panel.

2. The display device of claim 1, wherein the first data line and the second data line are adjacent to each other.

3. The display device of claim 2, wherein the first pixel and the second pixel emit light of different colors from each other.

4. The display device of claim 1, wherein the first pixel and the second pixel emit light of a same color as each other.

5. The display device of claim 1, wherein the second gate signal is a signal obtained by shifting the first gate signal by one horizontal time period.

6. The display device of claim 1, wherein the first data line, the second data line, and the third data line are adjacent to each other.

7. The display device of claim 6, wherein the first pixel, the second pixel, and the third pixel emit light of different colors from each other.

8. The display device of claim 1, wherein the gate driver provides a third gate signal to the third gate line, wherein the second gate signal is a signal obtained by shifting the first gate signal by one horizontal time period, and wherein the third gate signal is a signal obtained by shifting the second gate signal by one horizontal time period.

9. The display device of claim 1, wherein the display panel further includes a fourth pixel disposed in the one pixel row, a fourth gate line connected to the fourth pixel and parallel to the first gate line, and a fourth data line connected to the fourth pixel and parallel to the first data line, wherein the third data line and the fourth data line are connected to each other at the second side of the display panel.

10. The display device of claim 9, wherein the first data line, the second data line, the third data line, and the fourth data line are adjacent to each other.

11. The display device of claim 1, wherein each of the first gate signal and the second gate signal includes a write gate signal, a compensation gate signal, an initialization gate signal, and a bypass gate signal, wherein each of the first pixel and the second pixel includes:

a first transistor including a gate electrode connected to a first node, a first electrode connected to a first power line, and a second electrode connected to a second node;

a second transistor including a gate electrode which receives the write gate signal, a first electrode which receives the data signal, and a second electrode connected to a third node;

a third transistor including a gate electrode which receives the compensation gate signal, a first electrode connected to the second node, and a second electrode connected to the first node;

a fourth transistor including a gate electrode which receives the initialization gate signal, a first electrode connected to an initialization voltage line, and a second electrode connected to the first node;

a fifth transistor including a gate electrode which receives the compensation gate signal, a first electrode connected to a reference voltage line, and a second electrode connected to the third node;

a sixth transistor including a gate electrode which receives an emission control signal, a first electrode connected to the second node, and a second electrode connected to a fourth node;

a seventh transistor including a gate electrode which receives the bypass gate signal, a first electrode connected to the initialization voltage line, and a second electrode connected to the fourth node;

a first capacitor connected between the first power line and the third node;

a second capacitor connected between the first node and the third node; and a light emitting diode connected between the fourth node and a second power line.

12. A display device, comprising:

a display panel which includes a plurality of gate lines, a plurality of data lines crossing the plurality of gate lines, and a plurality of pixels connected to the plurality of gate lines and the plurality of data lines;

a gate driver which provides a plurality of gate signals to the plurality of gate lines; and a data driver disposed adjacent to a first side of the display panel, wherein the data driver provides a plurality of data signals to the plurality of data lines, wherein at least three data lines among the plurality of data lines are connected to each other in series, and wherein the at least three data lines are connected to the data driver in series.

13. The display device of claim 12, wherein the at least three data lines are respectively connected to pixels which emit light of a same color as each other among the plurality of pixels.

14. The display device of claim 12, wherein the data driver includes a plurality of amplifiers which outputs the plurality of data signals, respectively, and wherein the at least three data lines are electrically connected to only one amplifier among the plurality of amplifiers.

15. The display device of claim 14, wherein a number of the plurality of amplifiers is less than or equal to a half of a number of the plurality of data lines.

* * * * *